US012778098B2

(12) United States Patent
Parker et al.

(10) Patent No.: US 12,778,098 B2
(45) Date of Patent: Nov. 3, 2026

(54) FISHING REEL MOTOR BRAKE

(71) Applicant: Pure Fishing, Inc., Spirit Lake, IA (US)

(72) Inventors: Benjamin Philip Parker, Chardon, OH (US); William D. Sebastian, Northfield, OH (US); William Eugene Rabbitt, Chesterland, OH (US); Robert F. Soreo, Cleveland Heights, OH (US)

(73) Assignee: Pure Fishing, Inc., Spirit Lake, IA (US)

( * ) Notice: Subject to any disclaimer, the term of this patent is extended or adjusted under 35 U.S.C. 154(b) by 369 days.

(21) Appl. No.: 18/547,078

(22) PCT Filed: Feb. 17, 2022

(86) PCT No.: PCT/US2022/016731
§ 371 (c)(1),
(2) Date: Aug. 18, 2023

(87) PCT Pub. No.: WO2022/178085
PCT Pub. Date: Aug. 25, 2022

(65) Prior Publication Data
US 2024/0147978 A1 May 9, 2024

Related U.S. Application Data

(60) Provisional application No. 63/151,343, filed on Feb. 19, 2021.

(51) Int. Cl.
*A01K 89/0155* (2006.01)

(52) U.S. Cl.
CPC .............................. *A01K 89/01555* (2013.01)

(58) Field of Classification Search
CPC ................................................ A01K 89/01555
(Continued)

(56) References Cited

U.S. PATENT DOCUMENTS 3,116,892 A 1/1964 Pickard
4,402,470 A * 9/1983 Hamayasu ....... A01K 89/01556 242/223

(Continued)

FOREIGN PATENT DOCUMENTS

CN 1359615 A 7/2002
CN 1806540 A 7/2006

(Continued)

OTHER PUBLICATIONS

JP6416693B2 English Translation (Year: 2018).*

(Continued)

*Primary Examiner* — Anna M Momper
*Assistant Examiner* — Tiffany Domonique Jefferson
(74) *Attorney, Agent, or Firm* — Husch Blackwell LLP

(57) ABSTRACT

A fishing reel including a housing, a shaft supported in the housing and configured to rotate relative to the housing around a shaft axis extended in a longitudinal direction of the shaft, and a spool fixed with the shaft to rotate with the shaft around the shaft axis for winding and unwinding a fishing line. The fishing reel also includes a stator fixed with the housing, where the spool is configured to rotate with the shaft relative to the stator and the housing, a stator magnet that is an electromagnet fixed with the stator, a rotor including a first rotor plate fixed with the shaft to rotate with the shaft around the shaft axis, and a first rotor magnet fixed with the first rotor plate. The stator magnet is configured to receive an electrical current and generate a magnetic field from the stator to the first rotor magnet.

19 Claims, 11 Drawing Sheets

(58) Field of Classification Search
USPC .......................................................... 242/288
See application file for complete search history.

(56) References Cited

U.S. PATENT DOCUMENTS

| | | | |
|---|---|---|---|
| 5,749,533 A | 5/1998 | Daniels | |
| 6,412,722 B1 | 7/2002 | Kreuser et al. | |
| 7,165,737 B2 | 1/2007 | Nakagawa et al. | |
| 7,175,120 B2 | 2/2007 | Ono | |
| 7,648,096 B2 * | 1/2010 | Niitsuma ......... | A01K 89/01555 242/286 |
| 8,344,571 B2 | 1/2013 | Lee | |
| 10,130,085 B2 | 11/2018 | Ishikawa et al. | |
| 2023/0354794 A1 * | 11/2023 | Cologni ............. | A01K 89/0178 |

FOREIGN PATENT DOCUMENTS

| | | |
|---|---|---|
| CN | 2800789 Y | 8/2006 |
| CN | 100998324 B | 1/2012 |
| JP | 2017127286 A | 7/2017 |
| JP | 6416693 B2 | 10/2018 |

OTHER PUBLICATIONS

Sony Semiconductor ToF (Time of Flight) Technology, https://www.sony-semicon.com/en/technology/industry/tof.html#:~:text=ToF%20depth%20sensors%20measure%20the,time%20elapsed%20between%20the%20two. (Year: 2025).*

* cited by examiner

FISHING REEL MOTOR BRAKE

BACKGROUND

A bait cast fishing reel has a shortcoming referred to as backlash, which occurs when the spool overruns the outgoing line, causing the outgoing line to be caught and pulled back under the rotating spool, resulting in a knotted tangle of line commonly referred to as a "bird's nest." Reels can include a braking device to brake the reel prior to a backlash condition to reduce the likelihood of the line tangling.

Known braking devices rely on a first permanent magnet that is selectively positioned in proximity to a second permanent magnet or a magnetic feature otherwise attracted to the first permanent magnet. The relative motion between the first permanent magnet and the second permanent magnet or the magnetic feature generates a braking force on a shaft without requiring direct mechanical contact. However, such magnetic braking devices require permanent magnets and magnetic features having a size and corresponding magnetic field strength suitable for generating sufficient braking force on the shaft. Further, such magnetic braking devices require space necessary to repeatedly move one of the first permanent magnet and the second permanent magnet or the magnetic feature an effective distance to selectively generate and remove the braking force on the shaft. Consequently, such magnetic braking devices are often cumbersome and impractical in terms of weight and volume for stopping the fishing reel. Accordingly, there is a need for a relatively compact braking mechanism that does not experience excessive wear in generating a braking force on a shaft.

SUMMARY

A fishing reel includes a housing, a shaft supported in the housing and configured to rotate relative to the housing around a shaft axis extended in a longitudinal direction of the shaft, and a spool fixed with the shaft to rotate with the shaft around the shaft axis for winding and unwinding a fishing line. The fishing reel also includes a stator fixed with the housing, where the spool is configured to rotate with the shaft relative to the stator and the housing, a stator magnet that is an electromagnet fixed with the stator, a rotor including a first rotor plate fixed with the shaft to rotate with the shaft around the shaft axis, and a first rotor magnet fixed with the first rotor plate, where the stator magnet is configured to receive an electrical current and generate a magnetic field from the stator to the first rotor magnet.

DETAILED DESCRIPTION

Figure 1:
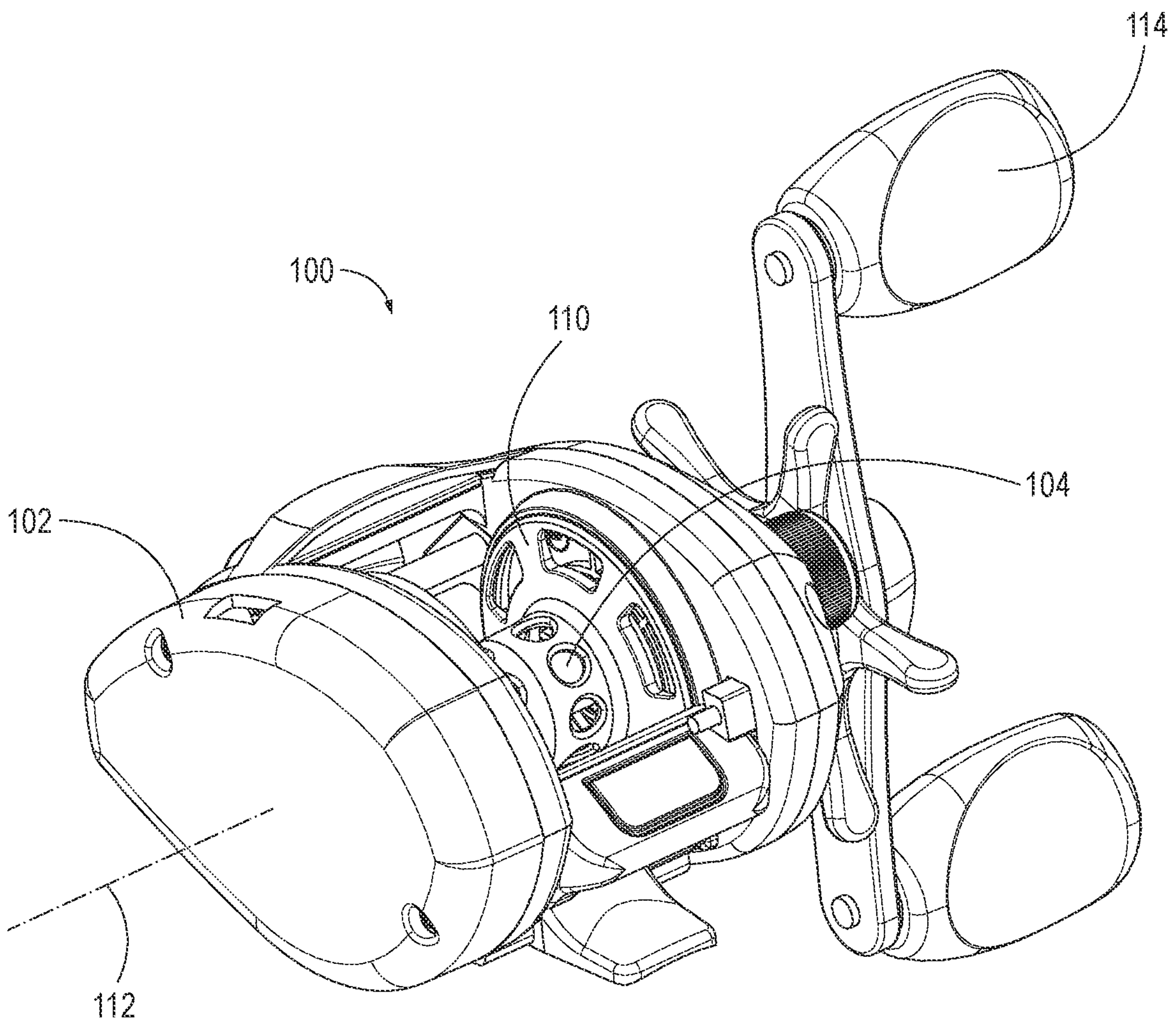
FIG. 1 is a perspective view of a fishing reel.

The description and drawings herein are merely illustrative and various modifications and changes can be made in the structures disclosed without departing from the present disclosure. Referring now to the drawings, where like numerals refer to like parts throughout the several views, FIG. 1 depicts a fishing reel 100 including a housing 102, a shaft 104, and a spool 110. The shaft 104 is supported in the housing 102 and configured to rotate relative to the housing 102 around a shaft axis 112 extended in a longitudinal direction of the shaft 104, along a width direction of the fishing reel 100. The spool 110 is fixed with the shaft 104 to rotate with the shaft 104 around the shaft axis 112 for winding and unwinding a fishing line (not shown) with respect to the fishing reel 100. The fishing reel 100 includes a handle 114 for manually turning the shaft 104 and by extension the spool 110 for winding and unwinding the fishing line with respect to the fishing reel 100.

Figure 2:
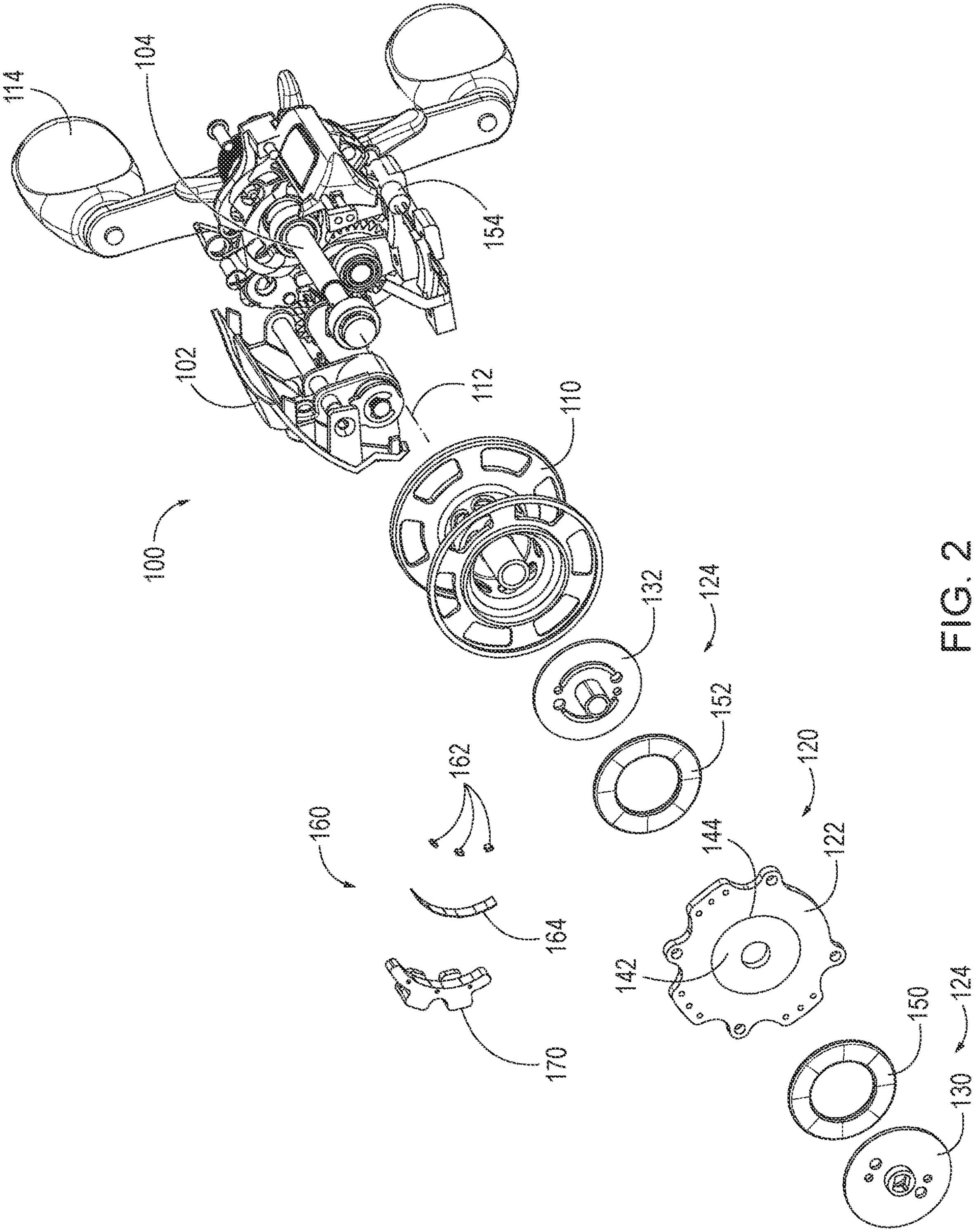
FIG. 2 is an exploded perspective view of the fishing reel.

As shown in FIG. 2, the fishing reel 100 includes a motor brake 120 fixed with the housing 102 and the shaft 104. The motor brake 120 includes a stator 122 and a rotor 124, which can be formed from a first rotor plate 130 and a second rotor plate 132. The stator 122 is fixed with the housing 102 to remain stationary with the housing 102 when the shaft 104 rotates around the shaft axis 112 relative to the housing 102. The first rotor plate 130 is fixed with the shaft 104 to rotate with the shaft 104 relative to the housing 102. The second rotor plate 132 is fixed with the shaft 104 to rotate with the shaft 104 relative to the housing 102. With this construction the rotor 124, including the first rotor plate 130 and the second rotor plate 132, is configured to rotate with the shaft 104 and the spool 110 relative to the housing 102 and the stator 122 when the fishing line is winding and unwinding with respect to the fishing reel 100.

The fishing reel 100 includes a stator magnet 142 that is an electromagnet fixed with the stator 122 to remain stationary with the housing 102 when the shaft 104, the spool 110, and the rotor 124 rotate relative to the housing 102. The stator magnet 142 is formed from stator windings 144 (depicted schematically) that are coil windings configured to receive an electric current and generate a magnetic field, and configured to generate an electric current when exposed to a changing magnetic field.

The rotor 124 includes a plurality of first rotor magnets 150 that are permanent magnets fixed with the first rotor plate 130 to rotate with the shaft 104 relative to the housing 102 and the stator 122, including the stator magnet 142. The rotor 124 includes a plurality of second rotor magnets 152 that are permanent magnets fixed with the second rotor plate 132 to rotate with the shaft 104 relative to the housing 102 and the stator 122, including the stator magnet 142. While the plurality of first rotor magnets 150 and the plurality of second rotor magnets 152 each include eight magnets depicted schematically, the plurality of first rotor magnets 150 and the plurality of second rotor magnets 152 each may include more or fewer magnets without departing from the scope of the present disclosure The fishing reel 100 includes a fishing line status sensor 154 fixed with the housing 102 to remain stationary with the housing 102 when the shaft 104, the spool 110, and the rotor 124 rotate relative to the housing 102. The fishing line status sensor 154 is configured to detect a section of fishing line unwinding from the spool 110 to generate line status information indicative of whether a loop is forming in the fishing line unwinding from the spool 110.

The fishing reel 100 includes a rotary sensor 160 fixed with the housing 102 to remain stationary with the housing 102 when the shaft 104, the spool 110, and the rotor 124 rotate relative to the housing 102. The rotary sensor 160 includes a plurality of magnetic flux sensors, such as Hall effect sensors 162, disposed on a flex circuit 164. The flex circuit 164 is supported on a mount 170 fixed with the stator 122. The rotary sensor 160 is configured to detect a magnetic field from the rotor 124 with the plurality of Hall effect sensors 162. Based on the magnetic field detected from the rotor 124, the rotary sensor 160 is configured to generate rotary position information of the shaft 104, the spool 110, and the rotor 124 with respect to the housing 102.

Figure 3:
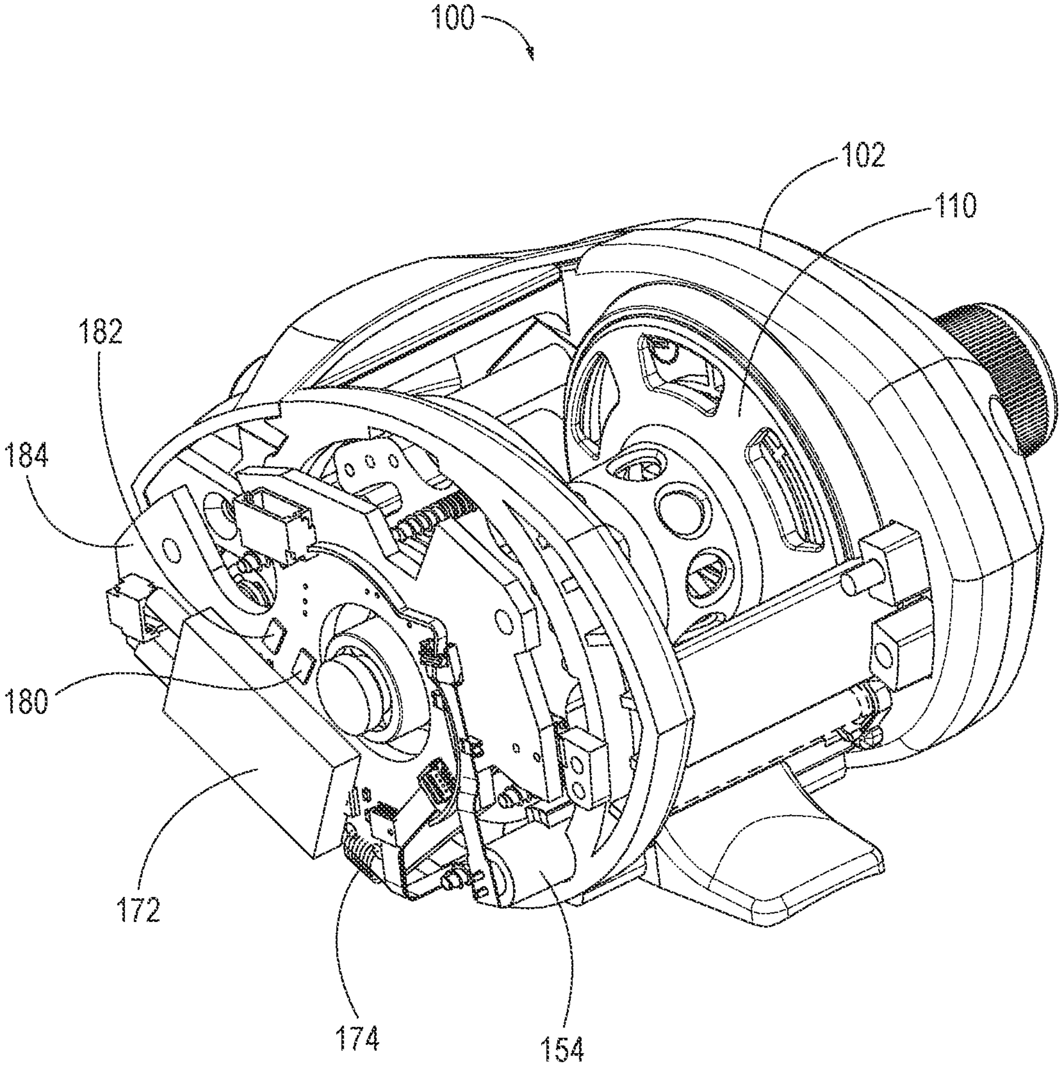
FIG. 3 is a perspective view of the fishing reel, with a portion of a housing removed.

FIG. 3 depicts the fishing reel 100 with a portion of the housing 102 removed. As shown in FIG. 3, the fishing reel 100 includes a battery 172 disposed in the housing 102 and connected with the stator 122 through a circuit 174. Magnetic fields from the first rotor magnets 150 and the second rotor magnets 152 extend to the stator magnet 142 such that the rotor 124 rotating relative to the stator 122 induces current in the stator magnet 142. In this manner, the stator 122 generates current in the circuit 174 and charges the battery 172 when the rotor 124 rotates relative to the stator 122.

The fishing reel 100 includes a controller 180 and a memory 182 connected with the circuit 174 and configured to control flow of current to the stator 122 through the circuit 174 from the battery 172. The controller 180, the memory 182, and the battery 172 are disposed on a support 184 that is a printed circuit board fixed with the housing 102. In this manner, the controller 180 and the memory 182 are fixed with the housing 102 and configured for actuating the stator 122 to initiate reverse current braking such that the stator 122 exerts a braking force on the shaft 104 through the rotor 124.

While, as depicted, the controller 180 and the memory are connected to the battery 172, the fishing line status sensor 154, and the rotary sensor 160 via the circuit 174, the controller 180 and the battery 172 may additionally or alternatively actuate the stator 122 through a wireless connection to the circuit 174, the battery 172, the fishing line status sensor 154, and the rotary sensor 160 for actuating the stator 122 without departing from the scope of the present disclosure.

The controller 180 is a computing device that processes signals and performs general computing and arithmetic functions. Signals processed by the controller 180 can include digital signals, computer instructions, processor instructions, messages, a bit, a bit stream, that can be received, transmitted and/or detected. The controller 180 can be a variety of various processors including multiple single and multicore processors and co-processors and other multiple single and multicore processor and co-processor architectures. The controller 180 can include logic circuitry to execute actions, instructions, and/or algorithms stored in the memory 182.

The memory 182 can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory 182 can store an operating system that controls or allocates resources of the controller 180.

Figure 4:
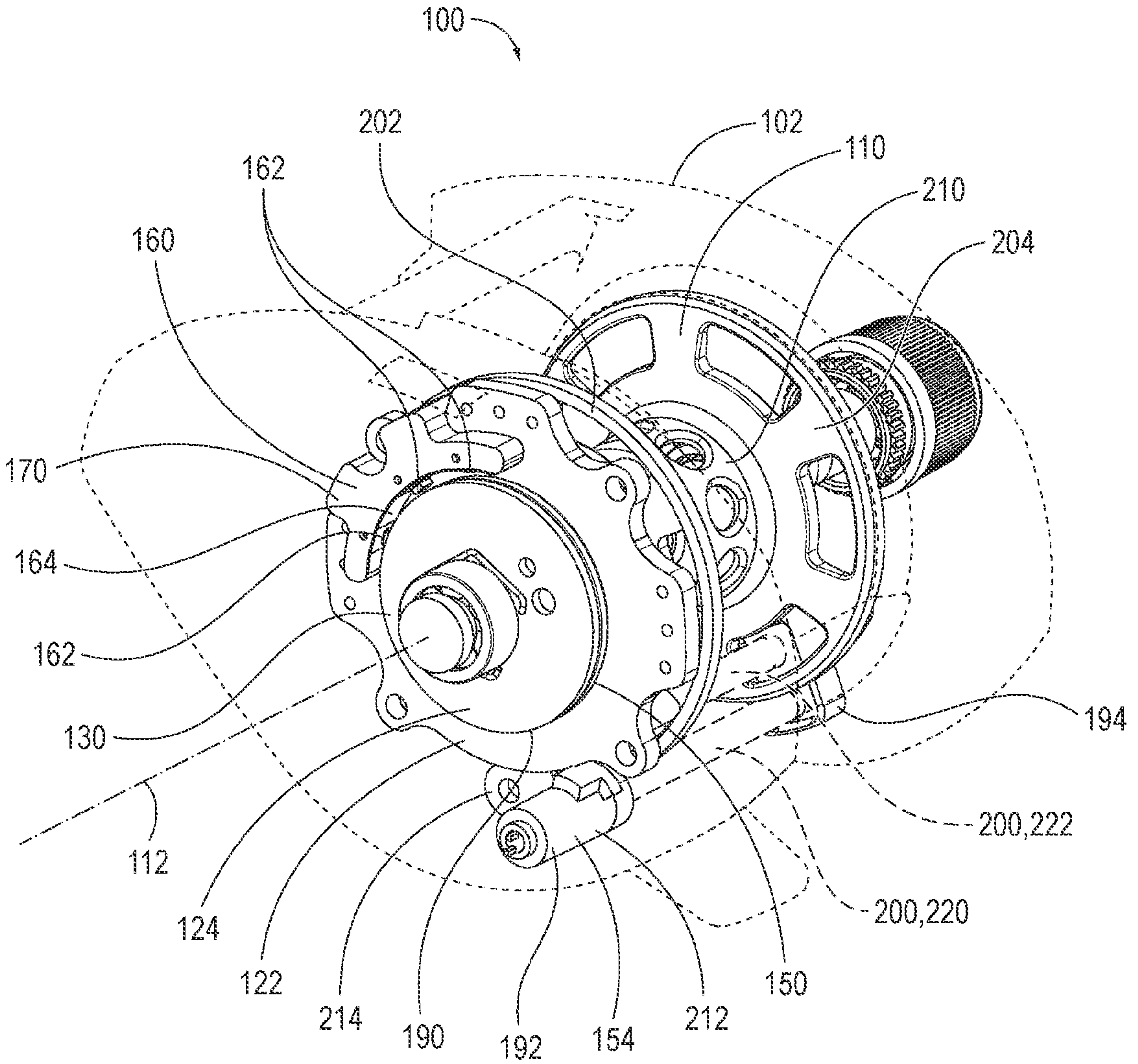
FIG. 4 is a first side perspective view of the fishing reel, partly disassembled.

FIG. 4 depicts the fishing reel 100 with the battery 172, the controller 180, and the support 184 of FIG. 3 removed therefrom, and with the housing 102 drawn in hidden lines. As shown in FIG. 4, the spool 110 and the rotor 124 are configured to rotate with the shaft 104 relative to the stator 122, the fishing line status sensor 154, the rotary sensor 160, and the housing 102.

The plurality of Hall effect sensors 162 are supported on the mount 170 and fixed with respect to the housing 102. The plurality of Hall effect sensors 162 are disposed along an outer perimeter 190 of the first rotor plate 130 and the first rotor magnets 150, in a circumferential direction of the first rotor plate 130 and the first rotor magnets 150.

The plurality of Hall effect sensors 162 are each configured to detect a magnitude of a magnetic field of the first rotor plate 130 and cooperate with each other for generating rotary position information of the rotor 124, the shaft 104, and the spool 110. The rotary position information generated by the rotary sensor 160 indicates a rotational position of the rotor 124, the shaft 104, and the spool 110 about the shaft axis 112 with respect to the housing 102. With this construction, the rotary sensor 160 is configured for detecting a magnetic field from the first rotor plate 130 via the plurality of Hall effect sensors 162 to detect a rotational position of the rotor 124, the shaft 104, and the spool 110 about the shaft axis 112 with respect to the housing 102.

The rotary sensor 160 is configured to transmit the rotary position information to the controller 180 via the circuit 174. The flex circuit 164 is connected to the circuit 174 for communicating power and information between the rotary sensor 160, the battery 172, and the controller 180. The controller 180 is configured to receive the rotary position information transmitted by the rotary sensor 160 to determine rotational speed of the rotor 124, the shaft 104, and the spool 110.

With continued reference to FIG. 4, the fishing line status sensor 154 includes a light source 192 and an optical sensor 194 fixed with the housing 102. The optical sensor 194 is configured to detect light 200 emitted from the light source 192 across a section (not shown) of the fishing line unwinding from the spool 110. In this manner, the fishing line status sensor 154 is configured to generate the line status information based on the light 200 detected across the fishing line by the optical sensor 194.

Figure 5:
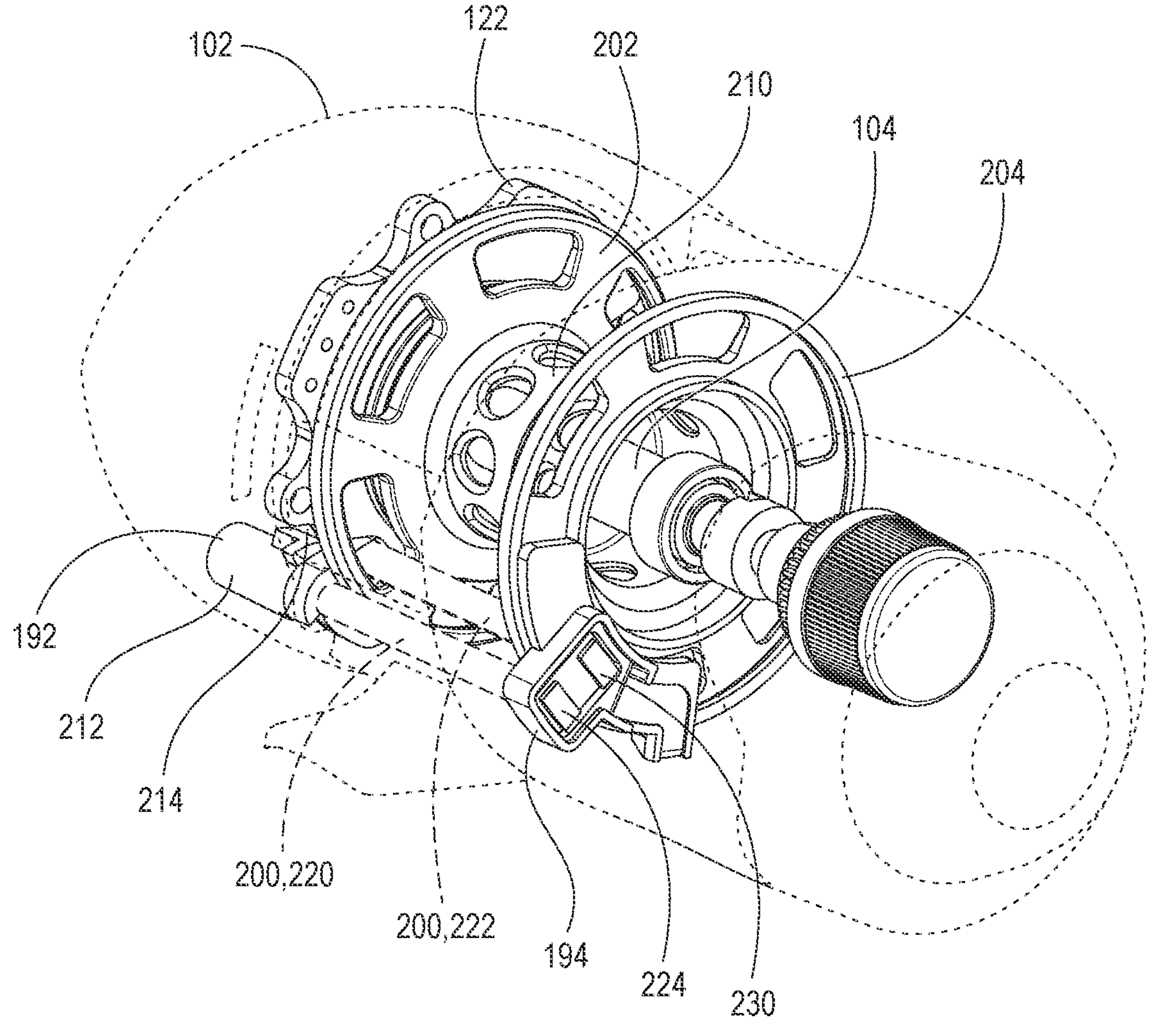
FIG. 5 is a second side perspective view of the fishing reel, partly disassembled.

The spool 110 includes a first flange 202, a second flange 204, and a spool shaft 210 interposed between and separating the first flange 202 and the second flange 204 in the longitudinal direction of the shaft 104 such that the spool 110 is configured to retain the fishing line wound on the spool shaft 210 in the longitudinal direction of the shaft 104. As shown in FIGS. 4 and 5, the light source 192 includes a beam emitter 212 and an optic 214 fixed in the housing 102 with the stator 122. The beam emitter 212 and the optic 214 are supported in the housing 102 ata side of the first flange 202 opposite the spool shaft 210 in the longitudinal direction of the shaft 104. The beam emitter 212 is configured to generate light in the light source 192. The optic 214 is configured collimate light from the beam emitter 212 such that the light source emits a first light beam 220 and a second light beam 222 toward the optical sensor 194 from behind the first flange 202 in the longitudinal direction of the shaft 104.

The optical sensor 194 includes a first receiver 224 and a second receiver 230 fixed in the housing 102 at a side of the second flange 204 opposite the spool shaft 210 in the longitudinal direction of the shaft 104. The first receiver 224 and the second receiver 230 are respectively configured for receiving and detecting the first light beam 220 and the second light beam 222 from the light source 192. The optical sensor 194 is configured to transmit the line status information to the controller 180 using a wired or wireless connection.

Figure 6:
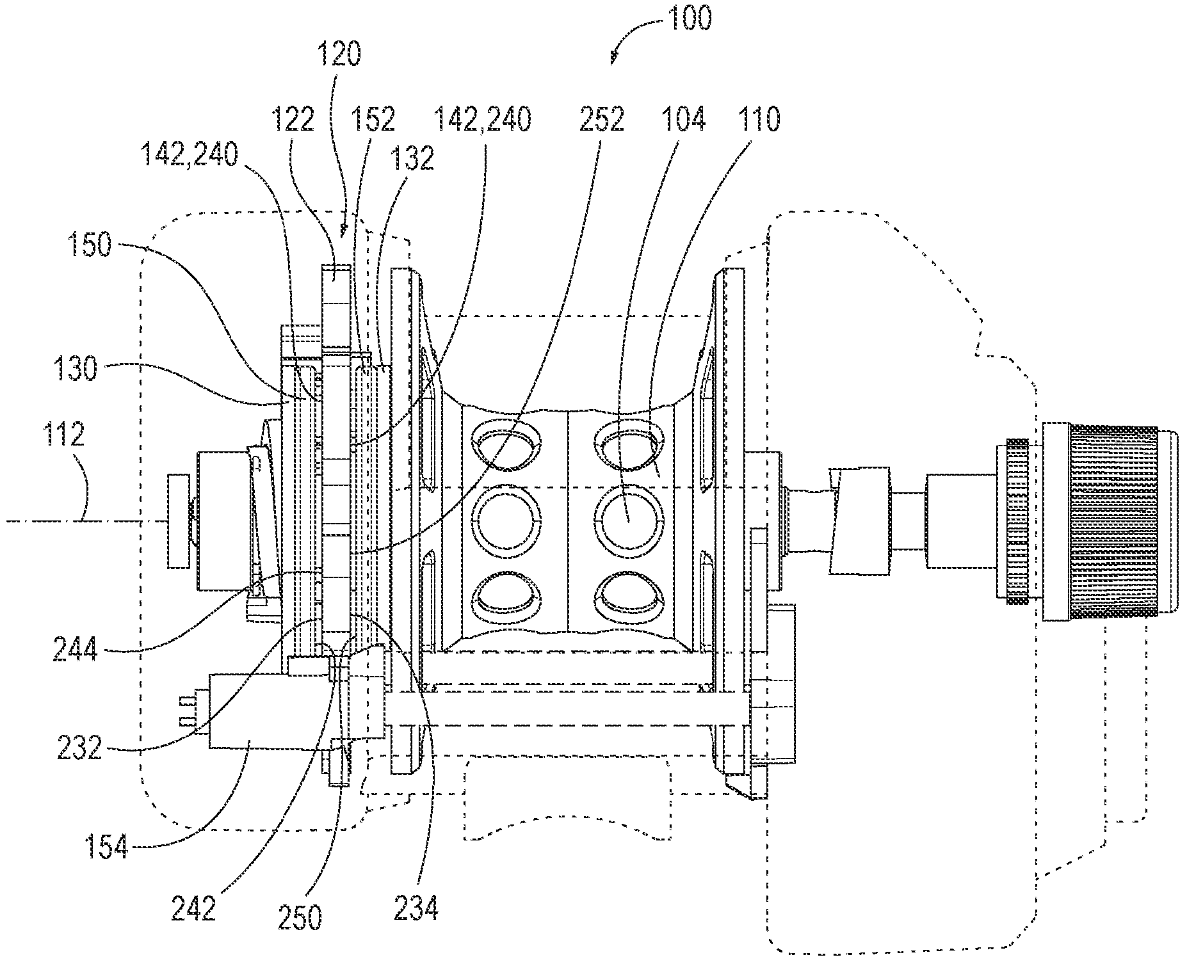
FIG. 6 is a front view of the fishing reel, partly disassembled.

As shown in FIG. 6, the stator 122 is interposed between and separates the first rotor plate 130 with the first rotor magnets 150 and the second rotor plate 132 with the second rotor magnets 152 in the longitudinal direction of the shaft 104. With this construction, the first rotor magnets 150 are positioned on the shaft 104 at a side of the stator 122 opposite the second rotor magnets 152 in the longitudinal direction of the shaft 104. The first rotor magnets 150 and the second rotor magnets 152 are spaced from the stator 122 such that when the controller 180 actuates the stator 122, the stator magnet 142 generates a magnetic field from the stator 122 to the first rotor magnets 150 and the second rotor magnets 152.

The stator 122 is formed from a printed circuit board defining a first stator surface 232 and a second stator surface 234 opposite the first stator surface 232 in the longitudinal direction of the shaft 104. As an example, the stator 122 can be formed from a multi-layer, e.g. 12 or more layered, circuit board. The first stator surface 232 and the second stator surface 234 are planar and respectively extend along the first rotor plate 130 and the second rotor plate 132, in a radial direction of the shaft 104 perpendicular to the longitudinal direction of the shaft 104.

The stator magnet 142 is a plurality of stator windings 240 that are coil windings that can be disposed on the first stator surface 232, the second stator surface 234 and intermediate layers, and is configured to receive electric current from the circuit 174 and generate a magnetic field. The stator windings 240 are disposed along the first rotor plate 130 and the second rotor plate 132 to define spaces between the first rotor plate 130 and the second rotor plate 132 in the longitudinal direction of the shaft 104.

With continued reference to FIG. 6, the first rotor plate 130 defines a planar first rotor surface 242 that extends in the radial direction of the shaft 104, along the first stator surface 232. The first rotor magnets 150 are disposed on the first rotor surface 242 to define a first space 244 between the first rotor magnets 150 and the stator 122 in the longitudinal direction of the shaft 104. The first rotor magnets 150 are arranged in the circumferential direction of the first rotor plate 130 for balanced rotation about the shaft axis 112. In such an embodiment, the stator windings 240 on the first stator surface 232 are spaced from the first rotor magnets 150 such that when the controller 180 actuates the stator 122, the stator windings 240 generate a magnetic field from the stator across the first space 244 to the first rotor magnets 150.

The second rotor plate 132 defines a planar second rotor surface 250 that extends in the radial direction of the shaft 104, along the second stator surface 234. The second rotor magnets 152 are disposed on the second rotor surface 250 to define a second space 252 between the second rotor magnets 152 and the stator 122 in the longitudinal direction of the shaft 104. The first rotor magnets 150 are arranged in the circumferential direction of the second rotor plate 132 for balanced rotation about the shaft axis 112. With this construction, the stator windings 240 on the second stator surface 234 are spaced from the second rotor magnets 152 such that when the controller 180 actuates the stator 122, the stator windings 240 generate a magnetic field from the stator 122 across the second space 252 to the second rotor magnets 152.

Continuing the above example, the first rotor magnets 150 and the second rotor magnets 152 are positioned along the shaft 104 spaced from the stator 122 such that the first rotor magnets 150 and the second rotor magnets 152 are configured to rotate with the shaft 104 around the shaft axis 112 without directly contacting the stator 122. In this manner, the motor brake 120 forms a brushless motor configured to brake and/or drive the spool 110 through the rotor 124 and the shaft 104, and does not experience excessive wear when braking and/or driving the spool 110.

The first rotor magnets 150 and the second rotor magnets 152 are positioned close to the stator 122 to minimize the first space 244 and the second space 252 in the longitudinal direction of the shaft 104, and with sufficient proximity to the stator 122 for the stator magnet 142 to generate a magnetic field through the first rotor magnets 150 and the second rotor magnets 152 effective for exerting a braking and/or driving force on the rotor 124 from the stator 122. The first rotor plate 130, the first rotor magnets 150, the second rotor plate 132, the second rotor magnets 152, and the stator 122 respectively form plate shapes having minimal thicknesses in the longitudinal direction of the shaft 104 to reduce an overall thickness of the motor brake 120 in the longitudinal direction of the shaft 104. With this construction, the motor brake 120 features a relatively compact construction where a size of the housing 102 necessary for fitting the stator 122 and the rotor 124 in the housing 102 is reduced.

Figure 7:
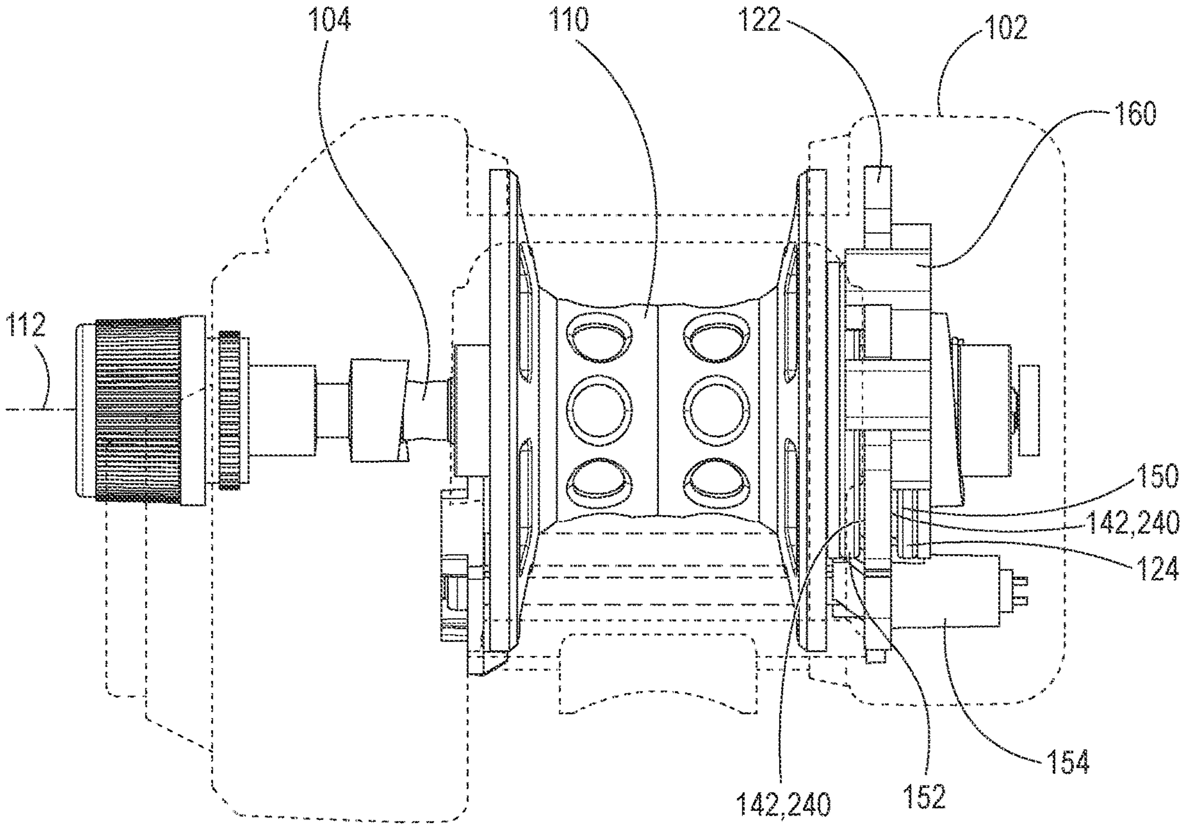
FIG. 7 is a back perspective view of the fishing reel, partly disassembled.

As shown in FIG. 7, the rotary sensor 160 is mounted to the stator 122 such that the rotary sensor 160 is fixed with the housing 102 through the stator 122. In the depicted embodiment, the mount 170 may extend from the stator 122 to position the Hall effect sensors 162 along the first rotor magnets 150. In another embodiment, the mount 170 may additionally or alternatively extend from the stator 122 to position the Hall effect sensors 162 along the second rotor magnets 152 for generating rotary position information based on a detected magnetic field from the second rotor magnets 152.

The fishing line status sensor 154 is configured to transmit the line status information to the controller 180, for example, during a casting operation in which the fishing line unwinds from the spool 110. The rotary sensor 160 is configured to transmit the rotary position information to the controller 180, including during the casting operation in which the fishing line unwinds from the spool 110.

With reference to FIGS. 3 and 7, during the casting operation, the shaft 104 rotates relative to the housing 102 in a first rotational direction around the shaft axis 112. The controller 180 is configured to direct current through the stator magnet 142 to perform reverse current braking with the rotor 124 such that the shaft 104 encounters the braking force from the stator 122 through the rotor 124 in a second rotational direction opposite the first rotational direction. The controller 180 is configured to direct current through the stator magnet 142 such that the stator 122 and the rotor 124 form a three phase motor configured to exert the braking force on the shaft 104 from the housing 102.

The controller 180 may be configured to initiate the reverse current braking based on the rotational speed of one or more of the rotor 124, the shaft 104, and the spool 110. For example, when the rotational speed of the rotor 124, the shaft 104, and/or the spool 110 is below a predetermined threshold, the controller 180 may be configured to perform the reverse current braking by directing current through stator windings 240. As such, the stator magnet 142 generates an active braking force magnetic field on the rotor 124 through the first rotor magnets 150. The active braking force magnetic field generated by the stator 122 urges the rotor 124 to rotate in the second rotational direction of the shaft 104, opposite to the first rotational direction of the shaft 104.

As another example, when the rotational speed of the rotor 124, the shaft 104, and/or the spool 110 exceeds the predetermined threshold, the controller 180 is configured to perform the reverse current braking with a passive braking force. For example, the controller 180 can direct current through the stator windings 240 while short circuiting one or more of the stator windings 240 during passive braking. As such, the stator magnet 142 generates a passive braking force magnetic field on the rotor 124 through the first rotor magnets 150. The passive braking force magnetic field generated by the stator 122 urges the rotor 124 to rotate in the same direction as the active braking force magnetic field but relatively smaller in magnitude. The controller 180 may also be configured to control the duration of the applied braking force in a manner where the passive braking force magnetic field is applied for a lesser time duration as compared to the active braking force magnetic field. For example, pulse-width modulation (PWM) or another control signal method could be employed to direct current through the stator windings 240 for longer times durations during active braking as compared to during passive braking, but the magnitude of the magnetic fields being generated may be relatively the same.

Figure 8:
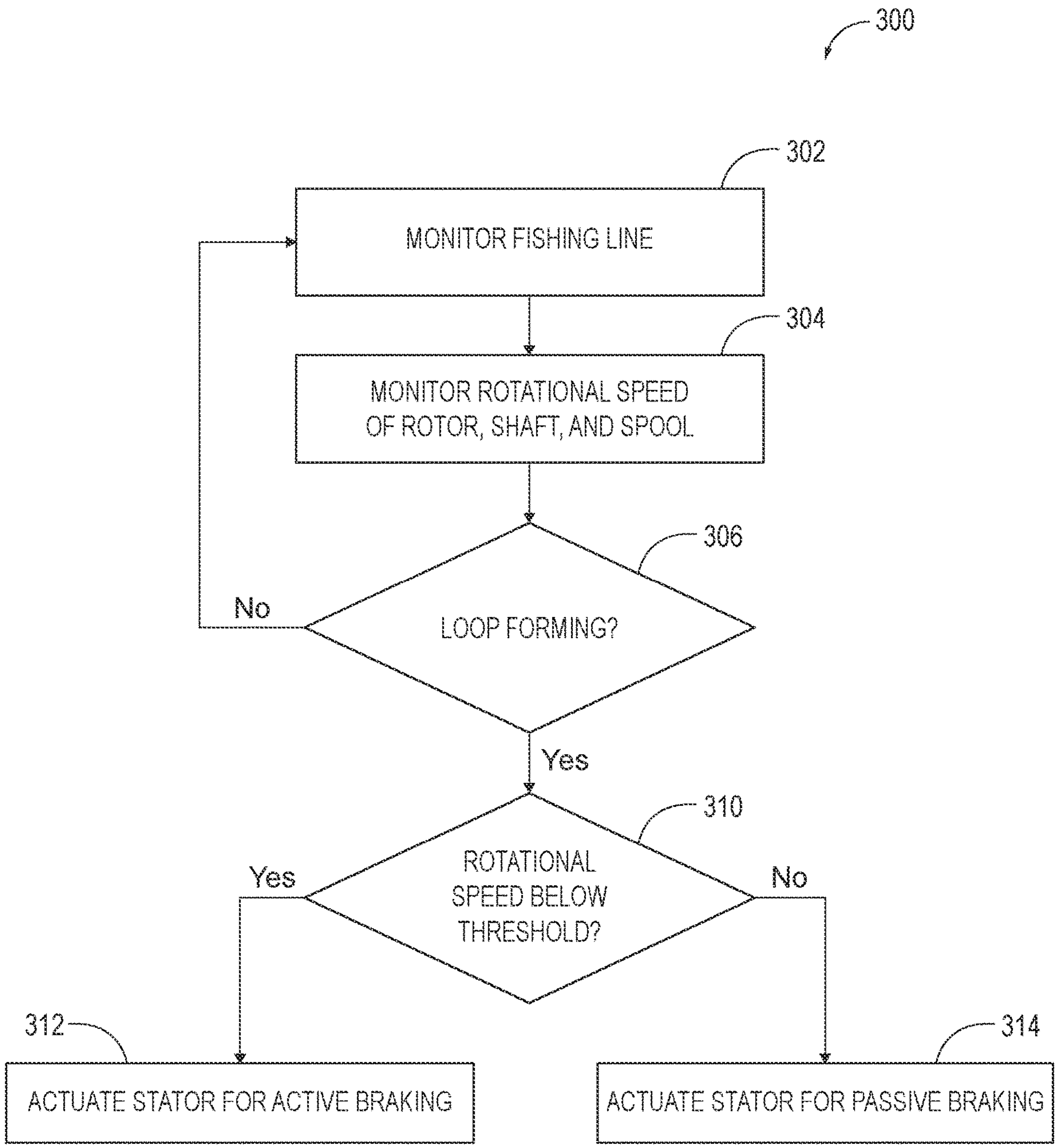
FIG. 8 is a flow diagram for actuating the fishing reel in active and passive braking.

FIG. 8 depicts a flow diagram detailing a method 300 of operating the fishing reel 100 during a casting operation. In this manner, the method 300 provides for monitoring the line status of the fishing line, at block 302, and the rotational speed of the rotor 124, the shaft 104, and the spool 110, at block 304, with the controller 180 based on the fishing line status information from the fishing line status sensor 154 and the rotary position information from the rotary sensor 160. The rotary position information received by the controller 180 over time during the casting operation is processed by the controller 180 to determine the rotational speed of the rotor 124, the shaft 104, and the spool 110. Information from the rotary sensor 160 is also used for timing (commutation) of drive currents sent to the stator 122 during active braking. The rotary sensor 160 may also be used to inform electronic operations for turning on and off generator functions for battery 172 charging and for controlling amplitude of resistance setting during charging corresponding to the amount of power harvested for charging.

At block 306 of the method 300, the controller 180 determines whether a loop is forming in the fishing line that is unwinding from the spool 110 based on the fishing line status information from the fishing line status sensor 154. If no loop is forming, then the line status of the fishing line and the rotational speed of the rotor 124, shaft 104, and spool 110 continue to be monitored. When the controller 180 determines a loop is forming in the fishing line, the method proceeds to block 310 of the method 300. At block 310, the controller 180 compares the rotational speed of the rotor 124, the shaft 104, and the spool 110 based on the rotary position information from the rotary sensor 160 to the predetermined threshold.

At block 310 of the method, the controller 180 determines if the rotational speed is below a predetermined threshold. The predetermined threshold may be a value corresponding to a predetermined rotational speed. To determine if the rotational speed, determined at block 304, is at or below the predetermined threshold, the controller 180 may compare the rotational speed to the predetermined threshold. If the rotational speed is below the predetermined threshold, the method 300 continues to block 312, and if the rotational speed is above the predetermined threshold the method 300 continues to block 314.

At blocks 312, 314 of the method 300, the controller 180 actuates the stator 122 with a current directed through the stator magnet 142 such that the stator magnet 142 generates a magnetic field from the stator 122 to the first rotor magnets 150 and the second rotor magnets 152. As such, the stator 122 exerts a braking force on the shaft 104 through the rotor 124. In this manner, the controller 180 is configured to actuate the motor brake 120 via the stator 122 when the controller 180 determines a loop is forming in the fishing line, whether the compared rotational speed is above or below the predetermined threshold.

With continued reference to FIG. 8, when, at block 310, the controller 180 determines the compared rotational speed of one or more of the rotor 124, the shaft 104, and the spool 110 is below the predetermined threshold, the method 300 proceeds to block 312. At block 312 the controller 180 directs current through the stator windings 240 such that the stator magnet 142 generates an active braking force magnetic field on the rotor 124 through the first rotor magnets 150 and the second rotor magnets 152. The active braking force magnetic field generated by the stator 122 is opposed to a rotational direction of the spool 110 while unwinding the fishing line. Accordingly, the controller 180 causes the stator 122 to affect the active braking force magnetic field on the rotor 124 in response to the controller 180 determining a loop is forming in the fishing line unwinding from the spool 110 during the casting operation, at block 306, and that the rotational speed is at or below the predetermined threshold, at block 310. Other thresholds may be determined to throttle the level of active braking applied and controlled via pulse-width modulation (PWM) or similar control signal where braking is applied for an on/off duty cycle at a frequency much higher than frequency of rotation the rotor 124, the shaft 104, and the spool 110. The controller 180 may also predetermine how long to apply the braking force based on a rotational speed sensed.

When, at block 310, the controller 180 determines the compared rotational speed is at or exceeds the predetermined threshold, the method 300 proceeds to block 314. At block 314, the controller 180 directs current through the stator windings 240 such that the stator magnet 142 generates a passive braking force magnetic field on the rotor 124 through the first rotor magnets 150 and the second rotor magnets 152. As mentioned above, the passive braking force magnetic field generated by the stator 122 is in the same direction as the active braking force magnetic field, opposite the rotational direction of the spool 110, but relatively smaller in magnitude or duration than the active braking force magnetic field. Accordingly, the controller 180 causes the stator 122 to affect the passive braking force magnetic field on the rotor 124 in response to the controller 180 determining a loop is forming in the fishing line unwinding from the spool 110 during the casting operation, at block 306, and that the rotational speed exceeds the predetermined threshold, at block 310. In this manner, the controller 180 actuates dynamic reverse current braking that is based on the rotational speed of one or more of the rotor 124, the shaft 104, and the spool 110.

FIGS. 9-12 depict a motor brake 400 for a fishing reel according to another aspect of the present disclosure. Unless otherwise stated, the motor brake 400 for a fishing reel described with reference to FIGS. 9-12 includes similar features and functions in a similar manner as the fishing reel 100 described with reference to FIGS. 1-8.

Figure 9:
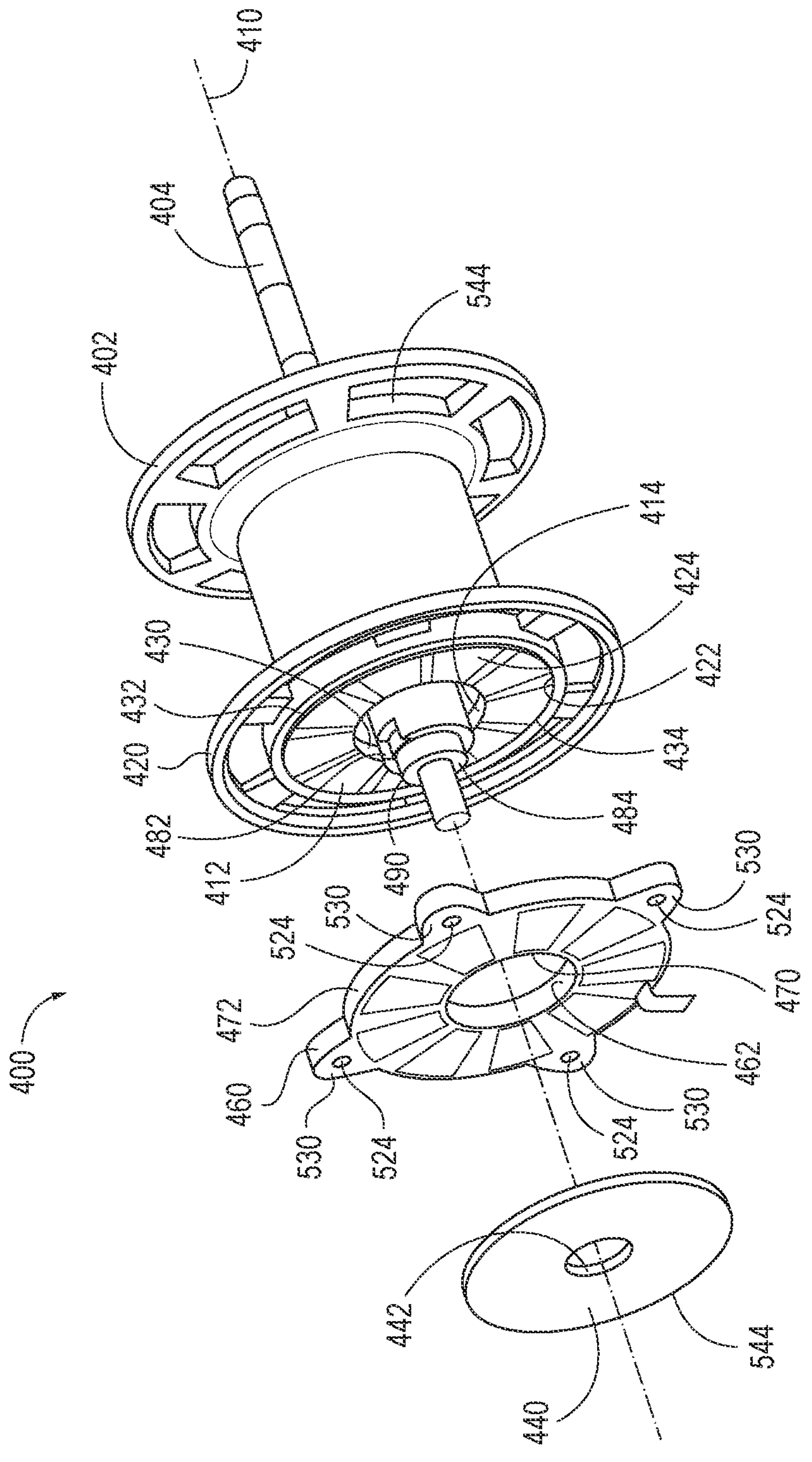
FIG. 9 is an exploded front perspective view of a fishing reel according to another aspect.

As shown in FIG. 9, the motor brake 400 includes a spool 402 fixed with a shaft 404 to rotate with the shaft 404 around a shaft axis 410 extended in a longitudinal direction of the shaft 404. A first rotor 412 is attached to the spool 402 such that the first rotor 412 is fixed with the shaft 404 through the spool 402 and configured to rotate with the spool 402 and the shaft 404 around the shaft axis 410. In the illustrated embodiment, the first rotor 412 is a right hand rotor plate having opposing planar surfaces normal to the shaft axis 410 and can be a circular plate oriented with a radial direction perpendicular to the shaft axis 410. The first rotor 412 defines a first aperture 414 extended along the shaft axis 410, where the shaft 404 extends through the first aperture 414 along the shaft axis 410 and the first rotor 412 is centered around the shaft 404 at the shaft axis 410. The first rotor 412 attaches to a first (right) flange 420 of the spool 402 and can be received inside a recess 422 provided in the first flange 420.

The first rotor 412 includes a first plurality of magnets fixed with the first rotor 412, arranged in a circumferential direction of the first rotor 412 perpendicular to the shaft axis 410, and extended in a radial direction of the first rotor 412 that is a radial direction of the shaft 404. Each magnet in the first plurality of magnets 424 is a permanent magnet that extends in the radial direction of the first rotor 412 between an inner edge 430 of the first rotor 412 that defines the first aperture 414, and an outer edge 432 of the first rotor 412 that defines an outer perimeter of the first rotor 412 in the radial direction of the first rotor 412. Each magnet in the first plurality of magnets 424 is provided on an outer surface 434, with respect to the spool 402, of the first rotor 412. An inner surface (not visible) of the first rotor 412 abuts the first flange 420.

The motor brake 400 includes a second rotor 440 fixed with the shaft 404 to rotate with the spool 402, the shaft 404, and the first rotor 412 around the shaft axis 410. In the illustrated embodiment, the second rotor 440 is a left hand rotor plate having opposing planar surfaces and is a circular plate oriented with a radial direction perpendicular to the shaft axis 410. The second rotor 440 defines a second aperture 442 extended along the shaft axis 410, where the shaft 404 extends through the second aperture 442 along the shaft axis 410 and the second rotor 440 is centered around the shaft 404 at the shaft axis 410.

Figure 10:
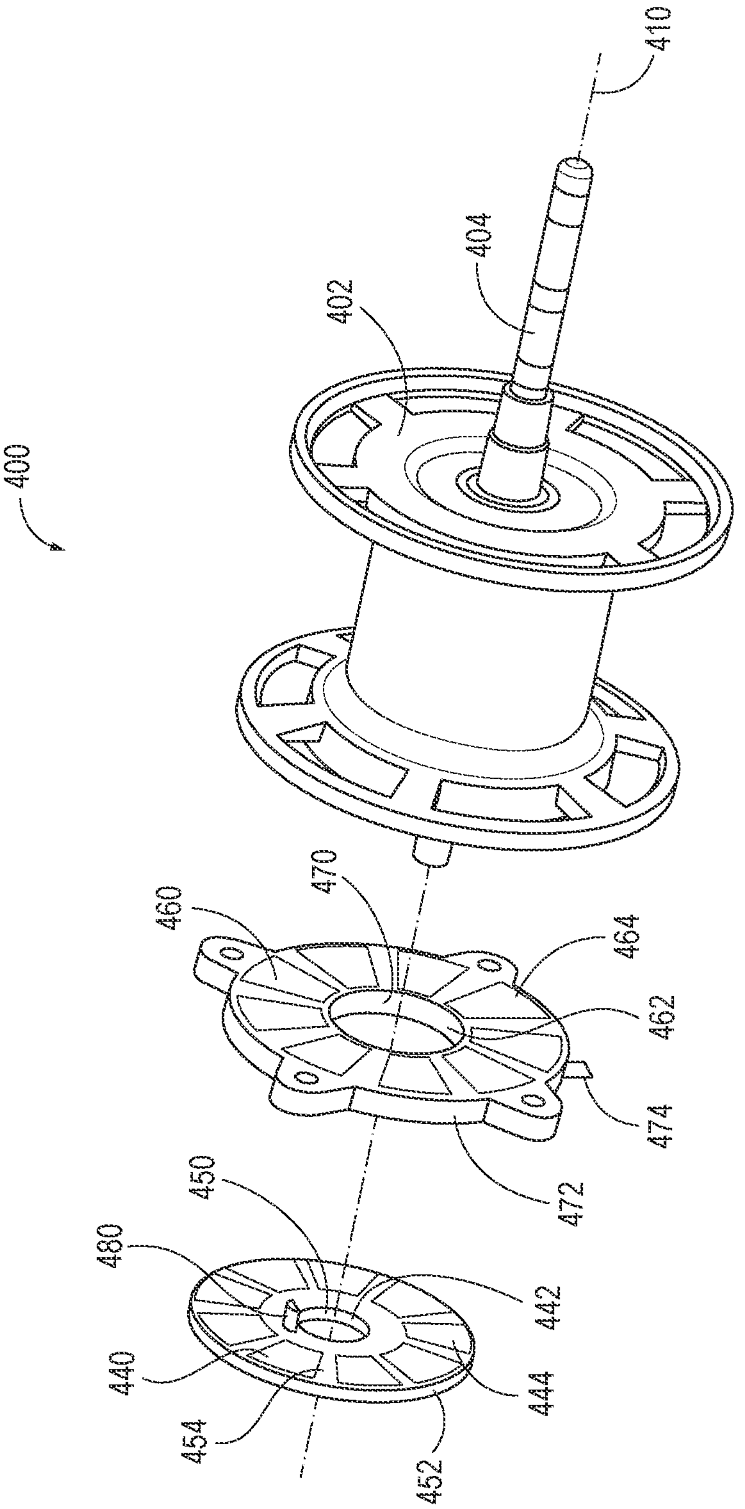
FIG. 10 is an exploded back perspective view of the fishing reel of FIG. 9.

As shown in FIG. 10, the second rotor 440 includes a second plurality of magnets 444 fixed with the second rotor 440, arranged in a circumferential direction of the second rotor 440 perpendicular to the shaft axis 410, and extended in a radial direction of the second rotor 440 that is the radial direction of the shaft 404. Each magnet in the second plurality of magnets 444 is a permanent magnet that extends in the radial direction of the second rotor 440 between an inner edge 450 of the second rotor 440 that defines the second aperture 442, and an outer edge 452 of the second rotor 440 that defines an outer perimeter of the second rotor 440 in the radial direction of the second rotor 440. Each magnet in the second plurality of magnets 444 is provided on an inner surface 454, with respect to the spool 402, of the second rotor 440.

The motor brake 400 includes a stator 460 configured to remain stationary relative to the spool 402, the shaft 404, the first rotor 412, and the second rotor 440 when the spool 402, the shaft 104, the first rotor 412, and the second rotor 440 rotate around the shaft axis 410. In the illustrated embodiment, the stator 460 is a substantially circular plate oriented with a radial direction perpendicular to the shaft axis 410, and defines a third aperture 462 extended along the shaft axis 410, where the shaft 404 extends through the third aperture 462 along the shaft axis 410 and the stator 460 is centered around the shaft 404.

The stator 460 includes a third plurality of magnets 464 fixed with the stator 460, arranged in a circumferential direction of the stator 460 perpendicular to the shaft axis 410, and extended in a radial direction of the stator 460 that is the radial direction of the shaft 404. Each magnet in the third plurality of magnets 464 is an electromagnet that extends in the radial direction of the stator 460 between an inner edge 470 of the stator 460 that defines the third aperture 462, and an outer edge 472 of the stator 460 that defines an outer perimeter of the stator 460 in the radial direction of the stator 460. Each magnet in the third plurality of magnets 464 is configured to selectively receive an electrical current supplied through a lead 474 and generate a magnetic field from the stator 460.

The second rotor 440 includes a key 480 configured to interlock with a keyway 482 depicted in FIG. 10, which is formed from a notch defined in the spool 402. As shown between FIGS. 9 and 10, the key 480 is configured to extend in the direction of the shaft axis 410 through the third aperture 462, toward and into the keyway 482. With the key 480 extended into the keyway 482, the key 480 and keyway 482 interlock the second rotor 440 and the spool 402 with respect to a rotational direction of the spool 402 around the shaft axis 410. While, as depicted, the spool 402 and the second rotor 440 are interlocked in the rotational direction of the spool 402 around the shaft axis 410 through the key 480 and the keyway 482, the second rotor 440 and the spool 402 may be additionally or alternatively fixed together with additional complementary pairs of keys and keyways respectively having a similar construction as the key 480 and keyway 482, other interlocking portions connected through the third aperture 462, adhesive, welding, or other joining means to fix the spool 402 with the second rotor 440 without departing from the scope of the present disclosure.

As shown in FIG. 9, the shaft 404 includes a shoulder 484 having a circular profile when viewed normal to the shaft axis 410, where the shoulder 484 has an outer surface 490 with a diameter complementary to the inner edge 450 of the second rotor 440 such that the second rotor 440 is seated on the shaft 404 at the shoulder 484, and the shoulder 484 supports the second rotor 440 on the shaft 404 in a direction perpendicular to the shaft axis 410. The third aperture 462 defined by the inner edge 470 of the stator 460 has an inner diameter larger than the diameter of the outer edge 472 of the stator 460 at the shoulder 484 such that the stator 460 is spaced from the shaft 404 and the second rotor 440, including the key 480. In this manner, the stator 460 does not directly contact the shaft 404 or the second rotor 440 when the second rotor 440 and the shaft 404 rotate around the shaft axis 410, and is configured to be stationary relative to the second rotor 440 and the shaft 404 when the second rotor 440 and the shaft 404 rotate around the shaft axis 410.

Figure 11:
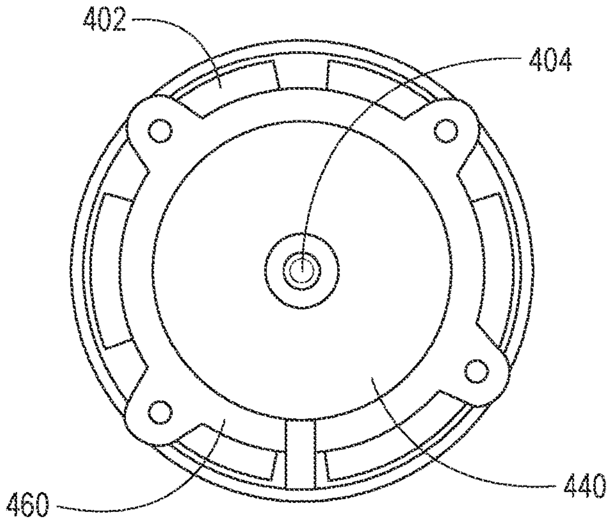
FIG. 11 is a front view of the fishing reel of FIG. 9.
Figure 12:
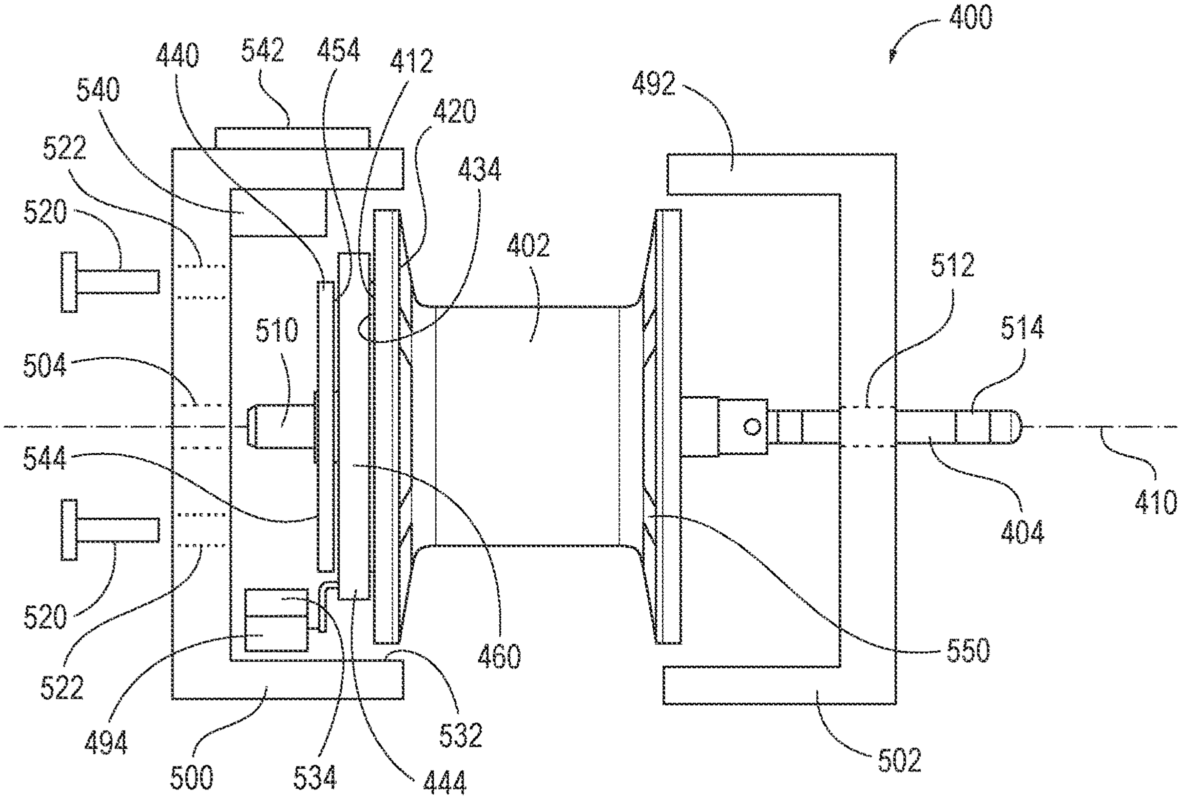
FIG. 12 is a schematic side view of the fishing reel of FIG. 9.

FIG. 11 depicts an axial view of the motor brake 400 including the spool 402, the stator 460, and the second rotor 440 assembled with the shaft 404, and FIG. 12 depicts a partially exploded side view of the motor brake 400, including a housing 492 and a battery 494 which are depicted schematically. As shown in FIG. 12, the housing 492 includes a first housing portion 500 and a second housing portion 502 configured to engage each other around the motor brake 400 and the spool 402 in the radial direction of the shaft 404. The first housing portion 500 includes a first axle bearing 504 shown in hidden lines and configured for receiving a proximal end 510 of the shaft 404 such that the proximal end 510 of the shaft 404 is supported in the first housing portion 500 in the direction perpendicular to the shaft axis 410 and the proximal end 510 of the shaft 404 is configured to rotate around the shaft axis 410 relative to the first housing portion 500. The second housing portion 502 includes a second axle bearing 512 shown in hidden lines and configured for receiving a distal end 514 of the shaft 404 such that the distal end 514 of the shaft 404 is supported in the second housing portion 502 in the direction perpendicular to the shaft axis 410 and the distal end 514 of the shaft 404 is configured to rotate around the shaft axis 410 relative to the second housing portion 502. In this manner, the housing 492 supports the shaft 404 in the direction perpendicular to the shaft axis 410, and the shaft 404 is configured to rotate around the shaft axis 410 relative to the housing 492. The distal end 514 can cooperate with a crank handle (not shown) through a clutch mechanism (not shown) to rotate the spool 402 in a conventional manner.

The stator 460 is fixed to the housing 492 with fasteners 520 directed into the housing 492 through openings 522 defined in the housing 492, and directed into holes 524 shown in FIG. 9 defined in the stator 460. As shown in FIG. 9, the stator 460 includes flanges 530 which define the holes 524 in the stator 460 configured to receive the fasteners 520, where the flanges 530 are positioned along the outer edge 472 of the stator 460 in the circumferential direction of the stator 460. While the depicted fasteners 520 are screws, the fasteners 520 may alternatively include bolts, pins, or similar types of fasteners without departing from the scope of the present disclosure. While the depicted motor brake 400 includes the fasteners 520 to fix the stator 460 to the housing 492, the motor brake 400 may additionally or alternatively feature adhesive, welding, or other joining means to fix the stator 460 with the housing 492 without departing from the scope of the present disclosure. With the stator 460 supported in and fixed to the housing 492, the spool 402, the shaft 404, the first rotor 412, and the second rotor 440 are configured to rotate together relative to the stator 460 and the housing 492.

As shown in FIG. 12, the stator 460 is interposed between and separates the first rotor 412 and the second rotor 440 along the shaft 404 in the direction of the shaft axis 410, where the first rotor 412 and the second rotor 440 are positioned along the shaft 404 spaced from the stator 460 such that the first rotor 412 and the second rotor 440 are configured to rotate with the shaft 404 without directly contacting the stator 460, and the stator 460 remains stationary relative to the first rotor 412 and the second rotor 440 when the first rotor 412 and the second rotor 440 rotate with the shaft 404 around the shaft axis 410 relative to the housing 492. The first rotor 412 and the second rotor 440 are positioned along the shaft 104 with the stator 460 such that when the third plurality of magnets 464 receives an electrical current and generates a magnetic field, the magnetic field extends through the first plurality of magnets 424 in the first rotor 412 and the second plurality of magnets 444 in the second rotor 440 for the first rotor 412 and the second rotor 440 and the shaft 104 experiences a braking force from the stator 460 through the first rotor 412 and the second rotor 440 to slow and stop the spool 402 and the shaft 404 from rotating around the shaft axis 410 relative to the stator 460 and the housing 492 when the first rotor 412 and the second rotor 440 are rotating around the shaft axis 410 relative to the stator 460. When the third plurality of magnets 464 does not receive an electrical current, the third plurality does not generate a magnetic field or exert a braking force onto the first rotor 412 and the second rotor 440.

The battery 494 is disposed in an interior of the housing 492 with the first rotor 412, the second rotor 440, and the stator 460, where the battery 494 is mounted to an inner surface 532 of the housing 492 which defines the interior of the housing 492. With the battery 494 mounted to the inner surface 532 of the housing 492, the battery 494 is stationary relative to the housing 492 and the stator 460 when the spool 402, the shaft 404, the first rotor 412, and the second rotor 440 rotate around the shaft axis 410 relative to the housing 492. The battery 494 is configured for supplying an electrical current to the third plurality of magnets 464 through the lead 474 such that the third plurality of magnets 464 generates a magnetic field that extends through the first plurality of magnets 424 in the first rotor 412 and the second plurality of magnets 444 in the second rotor 440 with sufficient strength for the first rotor 412 and the second rotor 440 to respectively experience a braking force with respect to the stator 460, where the braking force is sufficient to slow and/or stop the spool 402 from rotating around the shaft axis 410 relative to the stator 460 and the housing 492. In this manner, when the spool 402 is employed to cast a fishing line (not shown) such that the shaft 404, the first rotor 412, and the second rotor 440 rotate around the shaft axis 410 relative to the housing 492, the motor brake 400 is configured to apply a braking force on the shaft 404 through the first rotor 412, the second rotor 440, and the stator 460 at the end of the cast to slow and stop the spool 402 relative to the housing 492 and prevent backlash. In an embodiment where the motor brake 400 is configured to drive the spool 402 to reel in the fishing line onto the spool 402, or to aid in feeding out fishing line for an increased casting distance, the battery 494 supplies electrical current to third plurality of magnets 464 to generate a magnetic field configured to drive the first rotor 412 through the first plurality of magnets 424 and drive the second rotor 440 through the second plurality of magnets 444 around the shaft axis 410, which drives the shaft 404 and by extension the spool 402 around the shaft axis 410.

The battery 494 can be rechargeable, and the housing 492 can include a power inlet (not shown) configured for receiving power from an external power source to recharge the battery 494. In an alternative embodiment, the motor brake 400 does not include a battery and is configured to supply an electrical current to the third plurality of magnets 464 directly from the external power source.

In an embodiment, the motor brake 400 is configured to generate an electrical current and recharge the battery 494 when the first rotor 412 and the second rotor 440 rotate around the shaft axis 410 relative to the stator 460, such as during casting. To this end, when the first rotor 412 and the second rotor 440 rotate around the shaft axis 410 relative to the stator 460, the first plurality of magnets 424 and the second plurality of magnets 444 rotate around the shaft axis 410 relative to the third plurality of magnets 464 and the lead 474, where a magnetic flux experienced by the third plurality of magnets 464 and the lead 474 induces an electric current in the third plurality of magnets 464 and the lead 474 to recharge the battery 494.

With continued reference to FIG. 12, the motor brake 400 includes a controller 534 configured to actuate the battery 494 to supply electrical current to the third plurality of magnets 464, the controller 534 being disposed in the interior of the housing 492, mounted to the inner surface 532 of the housing 492 with the battery 494. When the spool 402 is employed to cast the fishing line, the controller 534 is configured to determine or predict occurrence of a "backlash" event in response to signals received from a sensor 540 supported on the housing 492, and is configured to actuate the battery 494 such that the motor brake 400 applies a braking force on the shaft 404 to slow and stop the spool 402 in a manner similar to that described in U.S. provisional patent application No. 63/128,895 with respect to a controller 24, a sensor 20, and a braking mechanism 26. In an alternative embodiment, the motor brake 400 includes a controller configured to actuate the battery 494 to supply electrical current to the third plurality of magnets 464, where the controller is disposed outside the housing 492. The motor brake 400 is also configured for receiving input to the controller 534 from a user through a user interface 542 to actuate the battery 494. The controller 534 can control charging the battery 494, for example by controlling a circuit connection between the battery 494 and a power source (not shown) to selectively prevent and enable an electrical current to flow to the battery 494 from the power source.

While the depicted motor brake 400 includes the stator 460 interposed between the first rotor 412 and the second rotor 440 along the shaft 404, the motor brake 400 may include more than one stator having a construction similar to the stator 460, with each stator being interposed between a pair of rotors along the shaft 404, each rotor having a construction similar to the first rotor 412 and the second rotor 440.

While the depicted motor brake 400 is configured for controlling rotation in portions of a fishing reel such as the spool 402 and the shaft 404 relative to the housing 492, the motor brake 400 may be configured to otherwise control rotation in portions of a device including a shaft and elements fixed on the shaft relative to a housing or other stationary structure without departing from the scope of the present disclosure.

With continued reference to FIG. 12, the first rotor 412 and the second rotor 440 are positioned along the shaft 404 spaced from the stator 460 such that the first rotor 412 and the second rotor 440 are configured to rotate with the shaft 404 around the shaft axis 410 without directly contacting the stator 460, and the stator 460 is configured to apply a braking force and/or a driving force on the shaft 404 through the first rotor 412 and the second rotor 440. In this manner, the motor brake 400 forms a brushless motor configured to brake and/or drive the spool 402, and does not experience excessive wear when braking and/or driving the spool 402.

The stator 460 is interposed between and separates the first rotor 412 and the second rotor 440 along the shaft 404 in the direction of the shaft axis 410 such that the first rotor 412 and the second rotor 440 sandwich the stator 460 and are positioned close to the stator 460 to minimize a distance between the inner surface of the first rotor 412 and an outer surface 544 of the second rotor 440 along the shaft 404 in the direction of the shaft axis 410, and with sufficient proximity to the stator 460 for the third plurality of magnets 464 to generate a magnetic field through the first plurality of magnets 424 and the second plurality of magnets 444 effective for exerting a braking and/or driving force on the first rotor 412 and the second rotor 440 from the stator 460. With this construction, the motor brake 400 features a relatively compact construction where a size of the housing 492 necessary for fitting the first rotor 412, the second rotor 440, and the stator 460 in the interior of the housing 492 in the direction of the shaft axis 410 is reduced.

The spool 402 includes a second flange 550 located on a side of the spool 402 opposite the first flange 420 with respect to the shaft axis 410, and with the first rotor 412 received inside the recess 422 provided in the first flange 420, the first rotor 412, the second rotor 440, and the stator 460 as a portion of the motor brake 400 are receded into the first flange 420 and positioned closer to the second flange 550 with respect to the shaft axis 410 as compared to a construction where the first rotor 412 is not received in the first flange 420, thereby reducing a distance between the outer surface 544 of the second rotor 440 and the second flange 550 in the direction of the shaft axis 410. With this construction, the motor brake 400 features a relatively compact construction where a size of the housing 492 necessary for fitting the spool 402, the first rotor 412, the second rotor 440, and the stator 460 in the interior of the housing 492 in the direction of the shaft axis 410 is reduced.

The first rotor 412, the second rotor 440, and the stator 460 are respectively formed from plates having thicknesses extended in the direction of the shaft axis 410, and the respective thicknesses of the first rotor 412, the second rotor 440, and the stator 460 are minimized to further reduce a distance between the inner surface of the first rotor 412 and the outer surface 544 of the second rotor 440. With this construction, the motor brake 400 features a relatively compact construction where a size of the housing 492 necessary for fitting the first rotor 412, the second rotor 440, and the stator 460 in the interior of the housing 492 in the direction of the shaft axis 410 is reduced.

It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A fishing reel comprising:

a housing;

a shaft supported in the housing and configured to rotate relative to the housing around a shaft axis extended in a longitudinal direction of the shaft;

a spool fixed with the shaft to rotate with the shaft around the shaft axis for winding and unwinding a fishing line;

a stator fixed with the housing, wherein the spool is configured to rotate with the shaft relative to the stator and the housing, wherein the stator has a first stator surface and a second stator surface;

a stator magnet that is an electromagnet fixed with the stator, wherein the stator magnet comprises a first stator winding disposed on the first stator surface and a second stator winding disposed on the second stator surface; and a rotor including:

a first rotor plate fixed with the shaft to rotate with the shaft around the shaft axis;

a first rotor magnet fixed with the first rotor plate;

a second rotor plate fixed with the shaft to rotate with the shaft around the shaft axis, and positioned on the shaft at a side of the stator opposite the first rotor plate such that the stator, the first stator winding, and the second stator winding are interposed between and separate the first rotor plate and the second rotor plate in the longitudinal direction of the shaft; and a second rotor magnet fixed with the second rotor plate, wherein the stator magnet is configured to receive an electrical current and generate a magnetic field from the first stator winding to the first rotor magnet and from the second stator winding to the second rotor magnet.

2. The fishing reel of claim 1, wherein the first rotor magnet is included in a plurality of first rotor magnets that are permanent magnets fixed with the first rotor plate and arranged in a circumferential direction of the first rotor plate perpendicular to the shaft axis, and the second rotor magnet is included in a plurality of second rotor magnets that are permanent magnets fixed with the second rotor plate and arranged in a circumferential direction of the second rotor plate perpendicular to the shaft axis.

3. The fishing reel of claim 2, wherein the second stator surface is on a side of the stator opposite the first stator surface in the longitudinal direction of the shaft, wherein the first stator surface and the second stator surface extend along the first rotor plate and the second rotor plate, perpendicular to the longitudinal direction of the shaft.

4. The fishing reel of claim 3, wherein the first rotor plate defines a planar first rotor surface, and the first rotor magnet is disposed on the first rotor surface to define a space between the first rotor magnet and the stator in the longitudinal direction of the shaft, and the second rotor plate defines a planar second rotor surface, and the second rotor magnet is disposed on the second rotor surface to define a space between the second rotor magnet and the stator in the longitudinal direction of the shaft.

5. The fishing reel of claim 1, wherein the first stator surface is a planar first stator surface that extends along the first rotor plate in a radial direction of the shaft perpendicular to the longitudinal direction of the shaft, and the second stator surface is a planar second stator surface that extends along the second rotor plate in the radial direction of the shaft perpendicular to the longitudinal direction of the shaft.

6. The fishing reel of claim 1, wherein the stator further comprises a printed circuit board, the first stator winding is disposed on the first stator surface defined by the printed circuit board, and the second stator winding is disposed on the second stator surface defined by the printed circuit board.

7. The fishing reel of claim 6, wherein the first rotor plate defines a planar first rotor surface, and the first rotor magnet is disposed on the first rotor surface to define a space between the first rotor magnet and the stator in the longitudinal direction of the shaft.

8. The fishing reel of claim 1, further comprising a battery disposed in the housing and connected with the stator through a circuit, wherein the rotor rotating relative to the stator induces current in the stator magnet such that the stator generates current in the circuit and charges the battery.

9. The fishing reel of claim 1, further comprising:

a controller configured to control flow of current to the stator; and a rotary sensor fixed with the housing, configured to generate rotary position information of at least one of the shaft, the spool, and the rotor with respect to the housing during a casting operation, and configured to transmit the rotary position information to the controller, wherein the controller is configured to:

determine a rotational speed of the at least one of the shaft, the rotor, and the spool during the casting operation based on the rotary position information received from the rotary sensor, compare the determined rotational speed to a predetermined threshold, when the determined rotational speed is below the predetermined threshold, direct current through the first stator winding and the second stator winding such that the stator magnet generates an active braking force magnetic field on the rotor through the first rotor magnet and the second rotor magnet, the active braking force magnetic field being opposed to a rotational direction of the spool while unwinding the fishing line, and when the determined rotational speed exceeds the predetermined threshold, direct current through the first stator winding and the second stator winding such that the stator magnet generates a passive braking force magnetic field on the rotor through the first rotor magnet and the second rotor magnet, the passive braking force magnetic field being in the same direction as the active braking force magnetic field but relatively smaller in magnitude or duration.

10. The fishing reel of claim 9, wherein the rotary sensor is mounted to the stator such that the rotary sensor is fixed with the housing through the stator.

11. The fishing reel of claim 9, wherein the rotary sensor includes a Hall effect sensor fixed with respect to the housing and configured for detecting a magnitude of a magnetic field to generate rotary position information of the rotor, wherein the controller receives the rotary position information of the rotor to determine rotational speed of the rotor.

12. The fishing reel of claim 11, wherein the rotary sensor includes a plurality of Hall effect sensors configured to detect a magnetic field of the first rotor plate and cooperate with each other for generating the rotary position information.

13. The fishing reel of claim 1, further comprising:

a controller fixed with the housing and configured for actuating the stator such that the shaft experiences a braking force from the stator through the rotor; and a fishing line status sensor fixed with the housing, the fishing line status sensor being configured to detect a section of fishing line unwinding from the spool to generate line status information, and configured to transmit the line status information to the controller, wherein the controller:

determines whether the line status information indicates a loop is forming in the fishing line unwinding from the spool during a casting operation, and actuates the stator with a current directed through the stator magnet such that the stator magnet generates a magnetic field from the stator to the first rotor magnet, and the shaft experiences a braking force from the stator through the rotor when the controller determines a loop is forming in the fishing line unwinding from the spool during the casting operation.

14. The fishing reel of claim 13, further comprising a rotary sensor fixed with the housing, configured to generate rotary position information of at least one of the shaft, the spool, and the rotor with respect to the housing during a casting operation, and configured to transmit the rotary position information to the controller, wherein the controller is configured to:

determine a rotational speed of the at least one of the shaft, the rotor, and the spool during the casting operation based on the rotary position information received from the rotary sensor, when the controller determines a loop is forming in the fishing line unwinding from the spool, compare the determined rotational speed to a predetermined threshold, when the determined rotational speed is below the predetermined threshold, direct current through the first stator winding and the second stator winding such that the stator magnet generates an active braking force magnetic field on the rotor through the first rotor magnet and the second rotor magnet, the active braking force magnetic field being opposed to a rotational direction of the spool while unwinding the fishing line, and when the determined rotational speed exceeds the predetermined threshold, direct current through the first stator winding and the second stator winding such that the stator magnet generates a passive braking force magnetic field on the rotor through the first rotor magnet and the second rotor magnet, the passive braking force magnetic field being in the same direction as the active braking force magnetic field but relatively smaller in magnitude or duration.

15. The fishing reel of claim 13, wherein the fishing line status sensor includes a light source and an optical sensor fixed with the housing, the optical sensor being configured to detect light emitted from the light source, across the section of fishing line unwinding from the spool, to generate the line status information, and configured to transmit the line status information to the controller.

16. The fishing reel of claim 1, further comprising a controller configured for actuating the stator such that the shaft experiences a braking force from the stator through the rotor, wherein, during a casting operation which rotates the shaft relative to the housing in a first rotational direction around the shaft axis, the controller is configured to direct current through the stator magnet to perform reverse current braking with the rotor such that the shaft experiences a braking force from the stator through the rotor in a second rotational direction opposite the first rotational direction.

17. The fishing reel of claim 16, wherein when a rotational speed of the shaft is below a predetermined threshold, the controller is configured to perform the reverse current braking by directing current through the first stator winding and the second stator winding such that the stator magnet generates an active braking force magnetic field on the rotor through the first rotor magnet and the second rotor magnet, the active braking force magnetic field being opposed to the first rotational direction.

18. The fishing reel of claim 17, wherein when the rotational speed of the shaft exceeds the predetermined threshold, the controller is configured to perform the reverse current braking by directing current through the first stator winding and the second stator winding such that the stator magnet generates a passive braking force magnetic field on the rotor through the first rotor magnet and the second rotor magnet, the passive braking force magnetic field being in the same direction as the active braking force magnetic field but relatively smaller in magnitude or duration.

19. The fishing reel of claim 1, further comprising a controller fixed with the housing and configured for actuating the stator such that the shaft experiences a braking force from the stator through the rotor, wherein the controller is configured to direct current through the stator magnet such that the stator and the rotor form a three phase motor configured to exert a braking force on the shaft from the stator, and the controller is further configured to control a duration of the braking force via pulse-width modulation or signal control based on a sensed rotational speed of the shaft.

* * * * *